US009856743B2

(12) United States Patent
Kockenpo et al.

(10) Patent No.: US 9,856,743 B2
(45) Date of Patent: Jan. 2, 2018

(54) INSTRUMENTED FLOW PASSAGE OF A TURBINE ENGINE

(71) Applicant: Snecma, Paris (FR)

(72) Inventors: Florian Kockenpo, Moissy Cramayel (FR); Jermone Acquaviva, Moissy Cramayel (FR); Claude Gaston Corbin, Moissy Cramayel (FR); Jeremy Giordan, Moissy Cramayel (FR); Nicolas Seigneuret, Moissy Cramayel (FR); Nicolas Lamarche, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 235 days.

(21) Appl. No.: 14/722,877

(22) Filed: May 27, 2015

(65) Prior Publication Data
US 2015/0345335 A1   Dec. 3, 2015

(30) Foreign Application Priority Data

May 28, 2014 (FR) ..................... 14 54862
May 26, 2015 (FR) ..................... 15 54724

(51) Int. Cl.
*F01D 17/02* (2006.01)
*F01D 17/08* (2006.01)
(Continued)

(52) U.S. Cl.
CPC ............. *F01D 17/08* (2013.01); *F01D 9/065* (2013.01); *F01D 17/02* (2013.01); *F01D 17/085* (2013.01);
(Continued)

(58) Field of Classification Search
CPC ........ F01D 17/02; F01D 17/08; F01D 17/085; F01D 9/065; F05D 2220/36; F05D 2260/83; G01M 15/14
(Continued)

(56) References Cited

U.S. PATENT DOCUMENTS 4,433,584 A * 2/1984 Kokoszka ............... G01P 5/175
73/861.66
4,605,315 A * 8/1986 Kokoszka ............... G01K 13/02
374/138
(Continued)

FOREIGN PATENT DOCUMENTS

EP  1 770 245 A1  4/2007
FR  2 952 713 A1  5/2011
FR  2 975 771 A1  11/2012

*Primary Examiner* — Christopher Verdier
(74) *Attorney, Agent, or Firm* — Blank Rome LLP

(57) ABSTRACT

An annular air flow passage for a turbine engine such as a turbojet or a turboprop, crossed by an instrumented rod that includes mechanism(s) for measuring characteristics of a flow potentially traveling along the passage, the rod extending between an outer annular wall and an inner annular wall of the passage. Outer connection(s) fasten(s) an outer end of the instrumented rod to the outer wall in a manner that is rigid in all directions, and inner connection(s) fasten(s) an inner end of the instrumented rod to the inner wall, in a manner that is rigid in the circumferential direction and that has at least one degree of freedom to move in a first direction extending between the inner and outer walls of the passage and having at least a radial component.

17 Claims, 4 Drawing Sheets

(51) Int. Cl.
*G01M 15/14* (2006.01)
*F01D 9/06* (2006.01)

(52) U.S. Cl.
CPC ......... *G01M 15/14* (2013.01); *F05D 2220/36* (2013.01); *F05D 2260/83* (2013.01)

(58) Field of Classification Search
USPC .......................................................... 415/118
See application file for complete search history.

(56) References Cited

U.S. PATENT DOCUMENTS

| | | | | |
|---|---|---|---|---|
| 6,595,062 B1 * | 7/2003 | Luke | ................... | F01D 17/085 73/170.02 |
| 2014/0096601 A1 * | 4/2014 | Barthelemy | .......... | F01D 25/285 73/112.01 |
| 2016/0348531 A1 * | 12/2016 | Rice | ....................... | F01D 17/08 |

* cited by examiner

INSTRUMENTED FLOW PASSAGE OF A TURBINE ENGINE

CROSS-REFERENCE TO RELATED APPLICATIONS

This application claims the benefit of French Patent Application 1554724, filed May 26, 2015, which claims the benefit of French Patent Application 1454862, filed on May 28, 2014, the contents of each of which are incorporated herein by reference.

FIELD OF THE INVENTION

The invention relates to an annular air flow passage having an instrumented rod passing therethrough, the passage being situated in general manner in a turbine engine.

BACKGROUND OF THE INVENTION

Conventionally, a bypass turbojet 10, as shown in FIG. 1, is constituted by a gas turbine 12 of axis 14 driving a ducted fan 16 which is generally located upstream (UP) from the engine. The mass of air sucked in by the engine is split into a primary air stream (arrow A) that flows through the gas turbine or engine core, and a secondary air stream (arrow B) that comes from the fan 16 and that surrounds the engine core, the primary and secondary air streams being coaxial.

In well-known manner, the primary air stream (arrow A) is generally compressed by a first compressor 18 referred to as a low pressure (LP) compressor or booster, having an LP shaft that is connected to the shaft of the fan 14 and that is driven in rotation by the shaft of the downstream low pressure turbine (not shown), the air then being compressed in a second compressor 20 further downstream (DN), referred to as a high pressure (HP) compressor, having an HP shaft that is driven in rotation by the shaft of a high pressure turbine arranged at the outlet from a combustion chamber and located upstream from the low pressure turbine (the combustion chamber and the turbines not being shown).

In such a two-spool turbojet, the term "intermediate casing" 22 is commonly used to designate a casing having its hub arranged between a casing 24 of the low pressure compressor 18 and a casing 26 of the high pressure compressor 20.

The intermediate casing 22 has an inner annular wall 28 defining the outside of the annular primary air flow passage 18, an intermediate annular wall 30 defining the inside of the annular secondary air flow passage 33, and an outer wall 35 defining the outside of the annular secondary air flow passage 33.

Furthermore, such a turbojet is generally provided with devices known as variable bleed valves (VBVs) 32 that serve to divert a portion of the primary air stream at the outlet from the LP compressor 18 into the annular channel 33 of the secondary air stream. By lowering the pressure downstream from the LP compressor 18, this bleeding has the effect of lowering its operating point and thus of reducing the risks of the compressor 18, 20 surging which would lead to a sudden reversal of the flow direction of the hot gas stream from the combustion chamber, and which could damage the compressor 18, 20. Furthermore, in the event of accidental penetration of water, in particular in the form of rain or hail, or indeed in the event of accidental penetration of various kinds of debris, which can harm the operation of a turbojet, these valves make it possible to recover such water or debris and eject it from the primary passage feeding air to the combustion chamber.

Thus, the bleed valves 32 are formed in the inner annular shroud 28 of the hub of the intermediate casing 32 and they communicate with a space lying between the inner annular shroud 28 and the intermediate shroud 30 of the intermediate casing 22.

In order to bleed off air, the hub of the intermediate casing 22 has a downstream transverse plate 34 arranged upstream from the high pressure compressor 20 of the turbojet and connecting together the downstream ends of the inner and intermediate annular shrouds 28 and 30. The downstream plate 34 has a plurality of first openings 36 distributed around the axis 14 of the turbojet 10, each communicating upstream with the inside of the hub and downstream with a duct 38 having its downstream end leading to a shroud 40 that is perforated by second openings downstream from an outer annular shroud 42 formed to extend the intermediate annular wall 30 of the intermediate casing 32 downstream.

As shown in FIG. 1, the hub of the intermediate casing 22 carries stator vanes 44 that extend between the intermediate wall 30 and the outer wall 35 of the intermediate casing 22. The stator vanes 44, also known as outlet guide vanes (OGVs), are for straightening out the secondary air stream coming from the upstream fan 16.

In the context of developing a turbine engine, it is necessary to measure and verify its performance. It is desired in particular to measure the flow parameters of the stream flowing in the secondary passage, such as its speed, its pressure, and its temperature. For this purpose, it has been found that it is preferable to arrange measurement sensors at certain precise locations in the secondary passage. One of these locations is situated downstream from the stator vanes 44 of the intermediate casing 22, in a plane lying at a particular angle of inclination relative to the axis of the turbine engine and passing via the perforated shroud 40. This location makes it possible to take good measurements of the performance of the assembly comprising the fan 16 and the guide vanes 44. In order to take exhaustive measurements of the stream in this location, it is desirable to arrange a plurality of sensors at different heights in the secondary passage, while remaining in this plane. Even though these sensors are incorporated in intrusive manner, they must not influence the normal operation of the turbine engine, and they must be capable of withstanding the environment in which they are to be found during testing, where such environments generally cover all of the possible operating ranges of the turbine engine. In particular, during such tests, it is possible to observe variations in temperature, in pressure, and in relative positioning of parts because of various assembly clearances and because of differential expansions.

SUMMARY OF THE INVENTION

The present invention provides a solution that is simple, effective, and inexpensive for incorporating instruments for measuring the stream flowing through the above-mentioned passage.

To this end, the invention provides an annular air flow passage for a turbine engine such as a turbojet or a turboprop, the passage being crossed by an instrumented rod including means for measuring characteristics of a flow potentially traveling along the passage, said rod extending between an outer annular wall and an inner annular wall of the passage, the passage being characterized in that outer connection means fasten an outer end of the instrumented rod to the outer wall in a manner that is rigid in all directions, and in that inner connection means fasten an inner end of the instrumented rod to the inner wall, in a manner that is rigid in the circumferential direction of the passage and that has at least one degree of freedom to move in a first given direction extending between the inner and outer walls of the passage and having at least a radial component.

By means of the invention, it is possible to position sensors along the entire length of the rod, and thus over the full height of the passage, thereby making it possible to measure exhaustively the flow of the stream in the pre-defined plane. By way of example, the rod may have a duct for passing cables that opens out through the outer wall of the passage so as to connect the sensors of the rod to external devices for collecting information. Because of the degree of freedom to move in at least said first direction extending between the inner and outer walls of the passage that is made possible at the inner end of the rod relative to the inner wall of the passage, the rod is not subjected to structural stresses in the event of differential expansion between the inner wall of the passage and the outer wall, or in the event of those two walls moving in operation as made possible by the various assembly clearances of the structure.

In another characteristic of the invention, the inner connection means fasten the inner end of the instrumented rod to the inner wall with a degree of freedom to move in a second given direction substantially perpendicular to the first given direction.

With such an arrangement, it is thus possible to allow the rod to move in translation in a first direction and in a second direction that is substantially perpendicular to the first direction.

Advantageously, the inner connection means comprise a shoe fastened rigidly to the inner wall and fastened rigidly to the inner end of the instrumented rod in the circumferential direction, and fastened thereto with at least one degree of freedom to move in a first direction having at least a radial component.

Preferably, the shoe and the inner end of the instrumented rod are engaged relative to each other with the ability to slide in at least said first direction.

In an embodiment, the shoe comprises a first shoe portion and a second shoe portion that are secured to each other and that define a housing in which the inner end of the rod is suitable for moving at least in said first given direction.

The fit between the shoe and the inner end of the instrumented rod may be of the H7/g6 type. Relative movement is thus allowed between the shoe and the inner end of the rod.

According to a characteristic of the invention, the housing may be defined by a downstream lug extending outwards from the second shoe portion and by a U-shaped recess that is open in the downstream direction in the first shoe portion.

The second shoe portion may be L-shaped with an axial wall carrying the downstream lug extending between the first shoe portion and the inner wall.

According to another characteristic of the invention, the axial wall of the second shoe portion is engaged axially in an axial groove in an inner face of the first shoe portion.

Preferably, the thickness of said axial wall is greater than the depth of said axial groove, thus making it possible to fasten the second shoe portion by clamping against the inner annular wall of the first shoe portion.

In a practical embodiment of the invention, the inner end of the rod is mounted with initial assembly clearance J, e.g. of 3 millimeters (mm), relative to the second shoe portion.

This clearance J may be formed between the inner end of the rod and the axial wall of the second shoe portion.

In another embodiment of the invention, at least one through orifice is formed in the inner end of the instrumented rod and is aligned in the circumferential direction with at least one through orifice in the shoe, a locking member being engaged through the above-mentioned orifices in the shoe and in the inner end of the instrumented rod.

According to an important feature, the section of the at least one orifice in the shoe is contained strictly within the section of the at least one orifice in the inner end of the rod, or vice versa. Thus, the locking member, which logically fits the size of the smaller of the orifices in the shoe or the inner end of the rod, can move freely within the other orifices that are of greater size, thereby allowing relative movement between the shoe and the inner end of the rod in the plane perpendicular to the axis of the orifices.

Preferably, at least one orifice in the shoe or in the inner end of the rod is of oblong shape, being elongate in alignment with the instrumented rod. In this way, greater relative movement is made available in the long direction of the rod.

The locking member engaged through the orifices in the shoe and the inner end of the rod is preferably a self-locking bolt configured so as to avoid clamping the shoe against the instrumented rod.

Advantageously, the shoe is fastened rigidly to a first shroud forming the inner wall of the passage, said shroud being arranged downstream from an annular row of stationary vanes extending across the passage and upstream from a perforated second shroud for bleeding air, and the outer end of the rod is fastened relative to the outer wall downstream from said row of stationary vanes. The perforated shroud through which the air bleed duct opens out is not suitable for supporting the instrumented rod in this type of configuration.

The shoe may have a downstream portion arranged axially facing the perforated second shroud and radially at a distance therefrom, the shoe being fastened to the inner end of the rod at said downstream portion. This enables the rod to be connected to the inner wall of the passage while lying in the measurement plane passing through the shroud through which the air bleed ducts open out in the above-defined configuration.

In order to lie in the measurement plane, the inner end of the instrumented rod may be situated upstream relative to the outer end of the instrumented rod.

A spacer may be mounted between the outer end of the instrumented rod and the outer wall of the passage.

The invention also provides a turbine engine, such as a turbojet or a turboprop, including an annular passage as described above.

BRIEF DESCRIPTION OF THE DRAWINGS

Other advantages and characteristics of the invention appear on reading the following description made by way of non-limiting example and with reference to the accompanying drawings, in which.

DETAILED DESCRIPTION OF THE INVENTION

Figure 1:
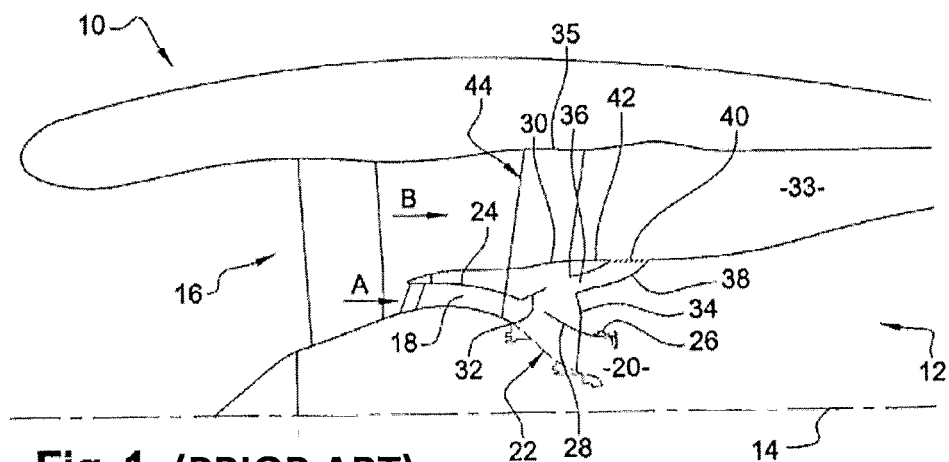
FIG. 1, described above, is a diagrammatic half-view in axial section of an aircraft turbojet of known type.
Figure 2:
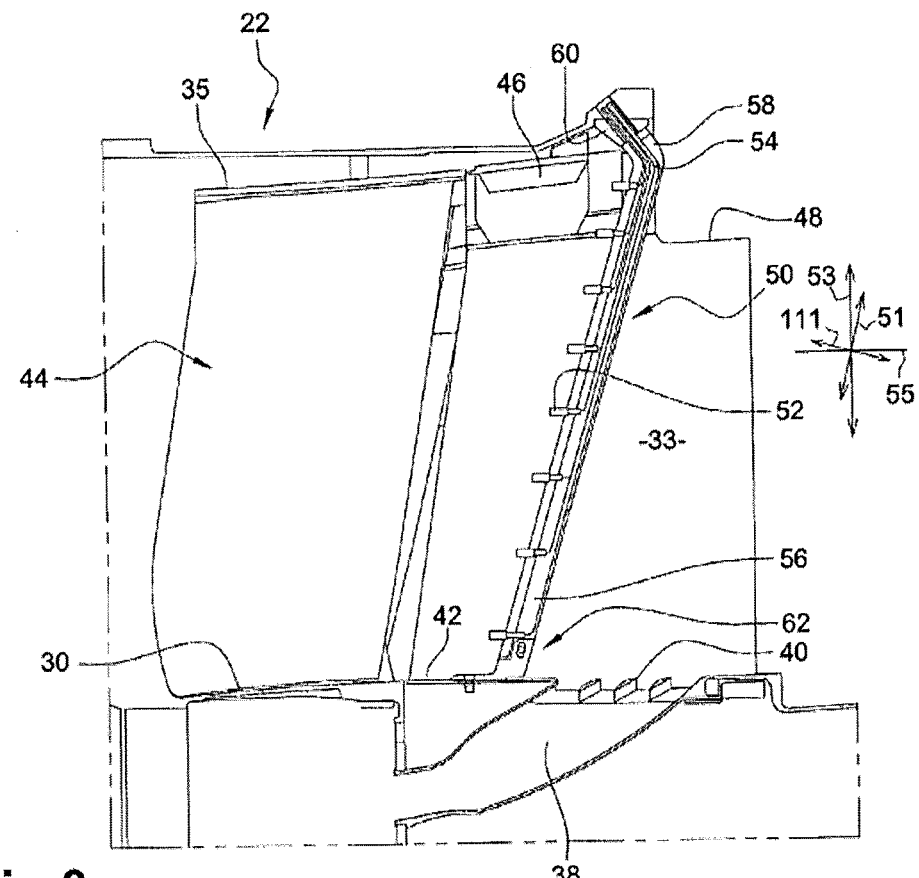
FIG. 2 is a half-view of a passage suitable for being fitted in the turbojet shown in FIG. 1.

FIG. 2 shows an instrumented rod incorporated in a turbine engine of the type shown in FIG. 1. There can thus be seen a secondary passage 33 having a plurality of OGVs 44 passing radially therethrough from an intermediate casing 22. From upstream to downstream, the inner boundary of the passage is formed respectively by the intermediate wall 30 of the intermediate casing, by a first shroud 42, and by a perforated second shroud 40 into which there open out the bleed ducts of the primary passage 18 of the turbine engine.

The outer boundary of the passage 33 is formed from upstream to downstream by the outer wall 35 of the intermediate casing 22, by an air/oil heat exchanger 46, and by an outer casing 48 of the turbine engine.

It is proposed to arrange an instrumented rod 50 through the above-described passage 33 so as to take the desired flow measurements. The rigid rod 50 is of the longitudinal type, and at its upstream edge it carries nozzles 52 with openings facing into the secondary stream B. The nozzles 52 are connected to cables 54 running along a duct formed within the rod 50 and leading to the outside of the passage 33 so as to enable the cable 54 to be connected to devices (not shown) for collecting and processing the measured information.

The instrumented rod 50 extends between the inner wall 30 and the outer wall 35 of the passage in a first given direction 51 situated in a plane perpendicular to a circumferential direction. This direction 51 has a component along a radial axis 53 and a component along an axial axis 55. This first direction 51 is contained in a radial plane, i.e. a plane containing the axis of the passage.

The rod 50 is inclined from upstream to downstream respectively from its inner end 56 to its outer end 58. Its angle of inclination follows the optimum plane for measuring flow in the selected location. The outer end 58 of the rod 50 bends upstream and outwards, and it is fastened to the outer casing 48 of the turbine engine downstream from the air/oil heat exchanger 46 by means of a spacer 60. The inner end 56 of the instrumented rod 50 is connected to a shoe 62, which is itself connected to the first shroud 42 of the inner wall of the passage, being situated axially between the intermediate wall 30 of the intermediate casing 22 and the perforated shroud 40 having the openings of the bleed ducts from the primary passage.

Figure 3:
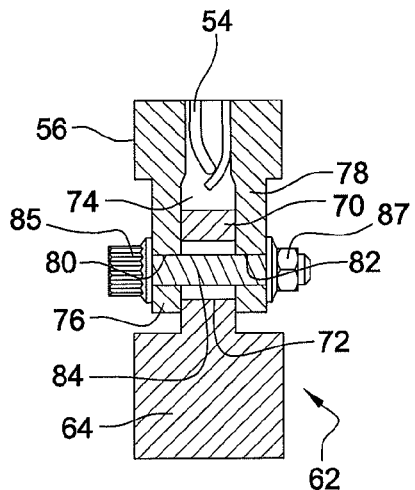
FIGS. 3 and 4 are complementary views of the connection between the shoe and the inner end of the instrumented rod in one embodiment.
Figure 4:
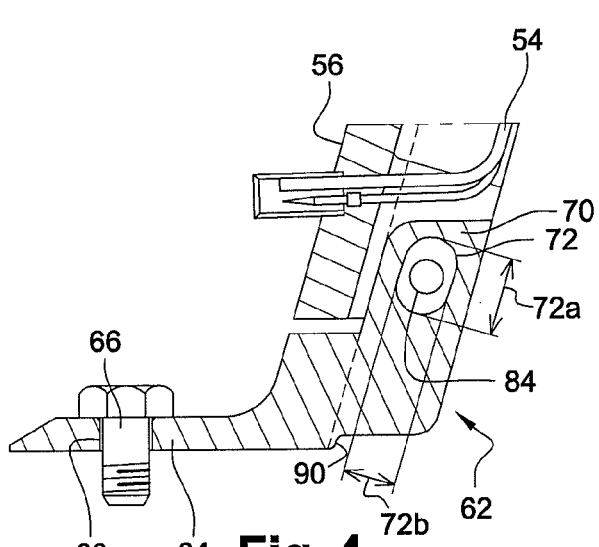

FIGS. 3 and 4 show in greater detail the shoe 62 and how it is connected to the inner end 56 of the instrumented rod 50. The shoe has an upstream toe 64 that has a radial hole for passing a screw 66 for fastening to the above-mentioned shroud 42 of the inner wall of the passage 33. A small amount of clearance is left between the above-mentioned screw 66 and the orifice 68 in the toe 64 so as to be able to accommodate dimensional dispersions in the passage, both axially and circumferentially, when assembling the described assembly. The toe 64 is connected downstream to a downstream portion or stud 70 extending downstream and outwards. The stud 70 has a circumferentially directed hole forming an orifice 72 of oblong shape having its long direction oriented in the same direction as the rod and extending over a distance referenced 72a, and having its short direction perpendicular to its long direction 72a and extending over a distance referenced 72b.

The inner end 56 of the instrumented rod 50 has a housing 74 of dimensions suitable for receiving the stud 70 of the shoe 62. The inner end 56 of the instrumented rod 50 thus has two walls or fingers 76, 78 with facing inside faces that are arranged circumferentially on opposite sides of the stud 70. Each of the two walls 76 and 78 has a circumferentially extending hole so as to form orifices 80, 82 that are in alignment with the oblong orifice 72 in the stud 70. The orifices 80, 82 in the fingers 76, 78 of the rod are circular and of sections that are contained within the oblong orifice 72 of the stud 70. More particularly, the diameter of each of the orifices 80, 82 is less than the long dimension 72a and less than the short dimension 72a of the oblong orifice 72. A threaded rod 84 of diameter corresponding to the orifices 80, 82 in the fingers 76, 78 is inserted and locked through the above-mentioned orifices 80, 82 and the oblong orifice 72 of the stud 70. The threaded rod has a head 85 at one of its ends that presses against one of the outside faces of the fingers 76, 78, and a clamping nut 87 is applied against the other one of the outside faces of the fingers 76, 78.

It can thus be understood that the inner end of the rod has a degree of freedom in the first direction corresponding to the direction 51 and in a given second direction 111 that is substantially perpendicular to the given first direction 51.

The fit between the stud 70 of the shoe 62 and the housing 74 in the rod 50 is of the sliding type, preferably of the H7/g6 type. The bolt formed by the threaded rod 84 and the nut 87 is self-locking, and the self-locking clamping of the bolt is configured so as to avoid deforming the walls 76, 78 of the housing 74 and so as to avoid pressing them against the stud 70 in order to conserve a sliding fit. It is thus possible for the stud 70 to slide axially and radially in the housing 74 within the movement limits available for the threaded rod 84 in the oblong hole 72 in the stud 70, while blocking the rod 50 relative to the shoe 62 in the circumferential direction. This serves in particular to avoid the rod 50 being set into vibration while performing measurements, while allowing the rod to expand longitudinally in testing.

A minimum clearance of 2 mm is preferably formed all around the threaded rod 84 in the oblong hole 72 in the stud 70, in order to make it possible while assembling the described assembly to accommodate axial and radial dimensional fabrication tolerances or dispersions of the parts that are assembled together to constitute the passage.

Figure 5:
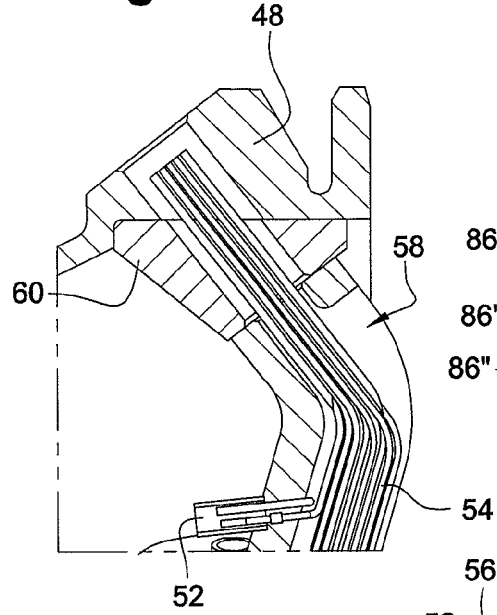
FIGS. 5 and 6 are complementary views of the connection between the outer end of the instrumented rod and the outer wall of the passage.
Figure 6:
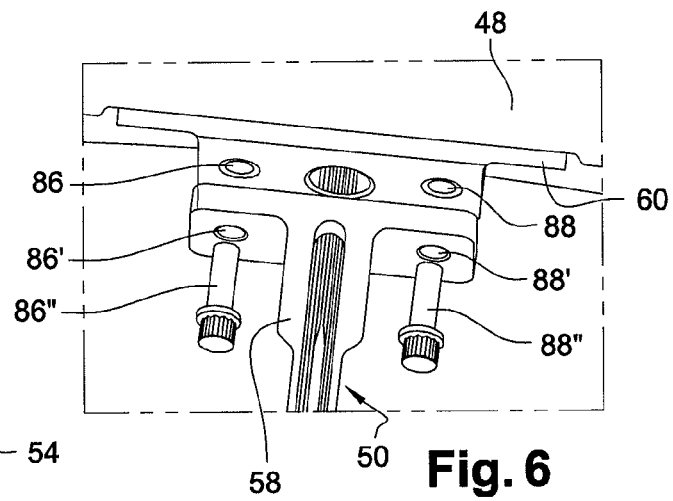

With reference to FIGS. 5 and 6, it can be seen that the outer end 58 of the instrumented rod 50 is fastened to the outer casing 48 of the turbine engine by means of a spacer 60. By means of this spacer 60, it is possible to form the rod 50 with a length that makes it easier to install in the passage. The spacer 60 co-operates with the outer end face of the rod 50 and the inside face of the outer casing 48. The spacer has through holes 86, 88 in alignment with holes (not shown) in the outer casing 48 and holes 86', 88' formed on flanges at the outer end 58 of the rod 50, these flanges being lateral and extending in a circumferential direction. It is thus possible to insert threaded rods 86", 88" through the sets of aligned holes in order to lock the outer end of the rod 50 rigidly against the outer casing 48, bolting using nuts.

Figure 7:
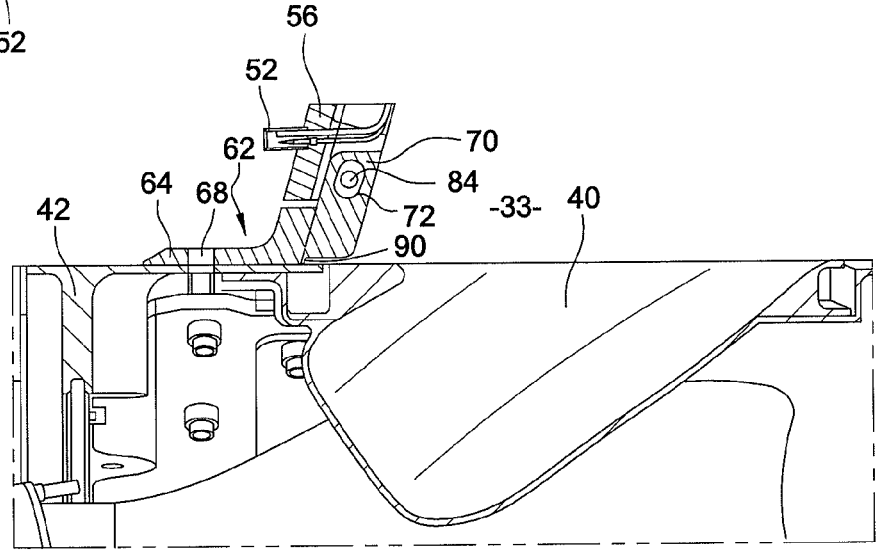
FIG. 7 is an enlargement of FIG. 2 in the region of the shoe.
Figure 8:
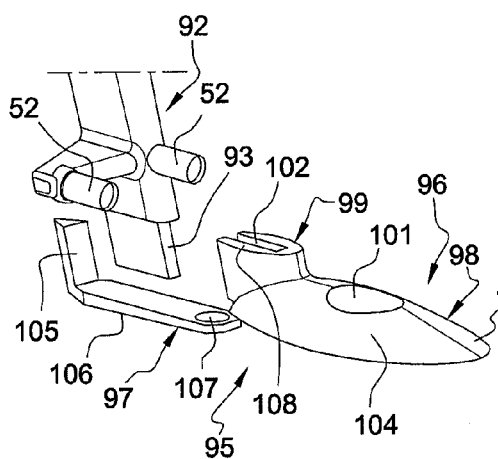
FIGS. 8 to 10 are diagrammatic perspective views of a second embodiment of an instrumented rod.
Figure 9:
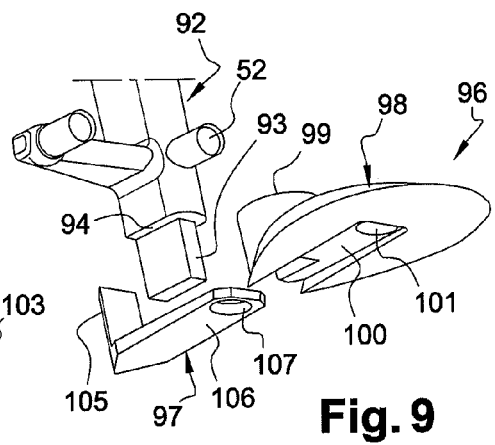

FIG. 7 makes it easier to understand how the shoe 62 is positioned relative to the inner wall of the passage 33. The perforated second shroud 40 possesses a structure and mechanical strength that are not suitable for fastening the instrumented rod 50 thereto. The optimum plane for performing flow measurements in the passage nevertheless passes via the shroud 42. The shoe 62 thus makes it possible, by using fastener means that are axially offset, to fasten respectively both with the rod 50 and with the inner wall of the passage, thereby keeping the rod 50 in the above-mentioned optimum measurement plane, while nevertheless using the first shroud 42 situated immediately downstream from the intermediate casing 22 as the support for fastening to the inner wall of the passage, which first shroud 42 has the structural strength needed for supporting the rod 50 during testing.

Furthermore, although the toe 64 of the shoe 62 is in direct contact via its inner surface with the first shroud 42 situated immediately downstream from the intermediate casing 22 in order to ensure reliable pressure and good relative fastening, the downstream portion of the toe 64, in contrast, is not in contact with the perforated second shroud 40, with the inner surface of the toe 64 having a raised downstream portion 90 or outward setback at that location. This ensures that the toe 62 does not press at all against the perforated second shroud 40.

FIGS. 8 to 12 show another way of incorporating an instrumented rod 92 in an annular secondary air flow passage of a turbojet as described above with reference to FIG. 1. Although not shown in FIGS. 8 to 12, the inner end 93 of the rod 92 is axially offset relative to its outer end. The rod also has an inner end 93 connected to the remainder of the rod 92 via a shoulder 94.

In this embodiment, and unlike the above-described embodiment, the shoe 95 has a first portion 96 and a second portion 97.

The first portion 96 of the shoe has an upstream toe 98 and a downstream portion or downstream stud 99 extending outwards in the direction 51. The inner surface of the toe 98 has an axial groove 100. The toe 96 also has a radial orifice 101 passing through it and opening out inwardly into the end wall of the groove 100. The stud 99 has a U-shaped recess 102 that is open in the downstream direction and that communicates inwardly with the downstream end of the groove 100. The toe 98 has an outer surface with a substantially plane upstream first surface portion 103 arranged axially between the upstream end of the toe 98 and the orifice 101, and with two lateral second surface portions 104 that are substantially convex. In a plane containing the axial axis 55 and the radial axis 53, the first surface portion 103 presents an angle of inclination relative to the inner surface of the toe 98 that is such that air striking this outer surface 103 is not deflected towards the nozzles 52 near the inner end of the rod 92.

Figure 11A:
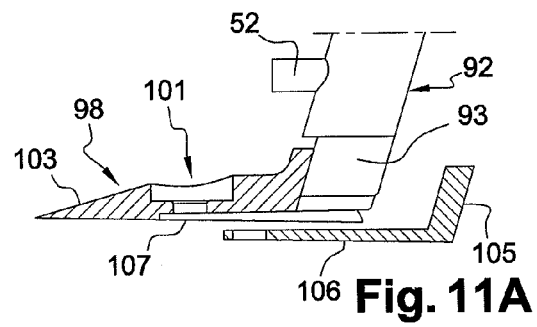
FIGS. 11A, 11B, and 11C are diagrammatic views of the sequence for assembling the inner end of an instrumented rod in the second embodiment.
Figure 11B:
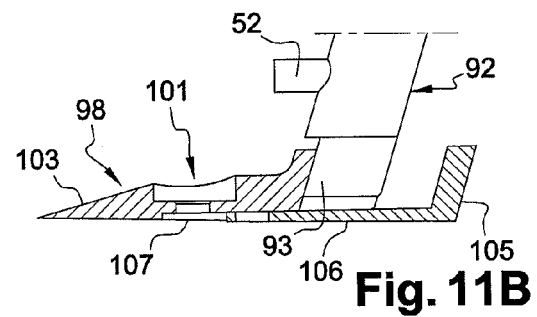
Figure 11C:
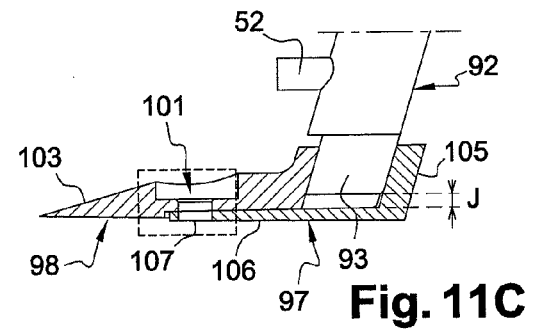
Figure 12:
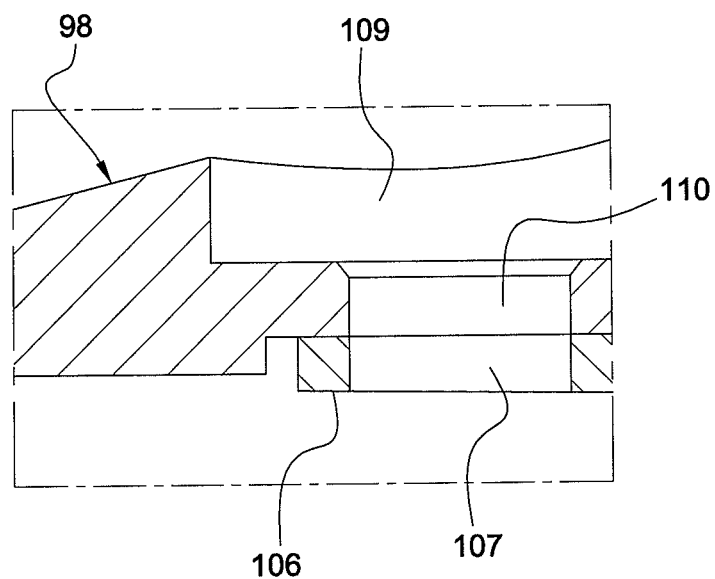
FIG. 12 is a view on a larger scale of the region defined by a dashed line in FIG. 11C.

The second portion 97 of the shoe is L-shaped, having both a downstream lug 105 extending outwards in the above-mentioned given direction 51, and also a wall 106 extending axially upstream from the downstream lug 105 for the purpose of engaging axially in the groove 100 of the inner face of the toe 98. The thickness of the axial wall 106 of the second portion 97 of the shoe is greater than the depth of the groove 100 so as to enable the axial wall 106 to be clamped between the toe 98 and the inner shroud (FIG. 11C and FIG. 12). The upstream end of the axial wall 106 of the second portion 97 of the shoe includes an orifice 107.

Figure 10:
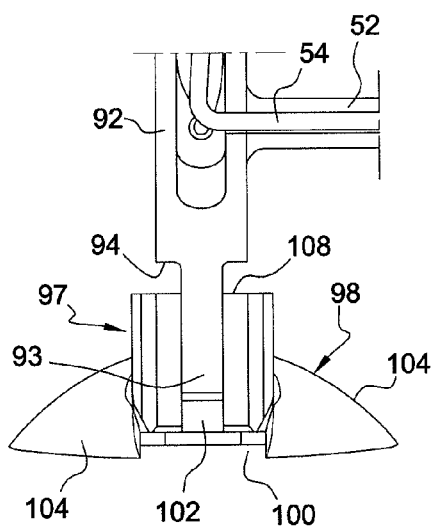

In the invention, the U-shaped recess 102 in the stud 99 and the downstream lug 105 of the second portion 97 of the shoe define between them a housing in which the inner end 93 of the rod 92 is engaged as a tight sliding fit, as shown in FIGS. 10 and 11C.

The inner end 93 of the rod 92 is mounted in the housing with initial assembly clearance J relative to the axial wall 106 of the second portion 97 of the shoe. This clearance J may for example be of the order of 3 mm.

The inner end 93 of the rod 92 is assembled with the shoe 95 as follows. The first portion 96 of the shoe is moved axially downstream so that the inner end 93 of the rod 92 is received in the U-shaped downstream recess 102 of the stud 99 of the first shoe portion 96, the shoulder 94 of the rod 92 then facing the outer edge 108 of the stud (FIG. 10 and FIG. 11A). Simultaneously with the above step, the second shoe portion 97 is engaged axially from upstream so that its axial wall 106 is received in the groove 100 of the inner surface of the toe 98 (FIG. 11B). In the assembled position (FIG. 11C), the axis of the orifice 101 in the toe 98 and the axis of the orifice 107 in the second shoe portion 97 are in radial alignment. As can be seen in FIGS. 11A, 11B, and 11C, and more precisely in FIG. 12, the orifice 101 in the toe 98 presents an outer first portion 109 of greater diameter than its inner second portion 110 so that the head of a fastener screw can be received fully therein in order to avoid having any impact on the stream of air flowing in the secondary passage. The second portion 110 of the orifice 101 in the toe 98 presents a diameter that is identical to that of the orifice 107 in the axial wall 106 of the second shoe portion 97.

The means for connecting the outer end of the rod 92 may be entirely similar to those described with reference to the above-described embodiment.

In this second embodiment, the rod 92 extends likewise along the first given direction 51 that has a component along a radial axis 53 and a component along an axial axis 55. The instrumented rod 92 is movable in translation only in the given direction 51, with movement solely in the second direction 111 substantially perpendicular to the first direction 51 being prevented by the downstream stud 99 and the downstream lug 105.

It can be understood that the first direction extends substantially along a mean line of the rod 50, 92. The invention is naturally applicable to a rod that is not rectilinear as in the embodiments shown in the figures, but, for example, that has undulations between its inner and outer ends.

Although the above description is made with reference to an annular passage of type that can be found in a turbine engine, it can clearly be seen that, in a manner that is obvious to the person skilled in the art, the invention can also be applied to any passage defined transversely between two walls, or by way of example by a single annular wall, and that has the instrumented rod arranged therein in the manner described above.

The invention claimed is:

1. An annular air flow passage for a turbine engine, the passage comprising:
    an instrumented rod that crosses it and measures characteristics of a flow traveling along the passage, said rod extending between an outer annular wall and an inner annular wall of the passage, the passage being characterized in that outer connection means fasten an outer end of the instrumented rod to the outer wall rigidly in all directions, and inner connection means fasten an inner end of the instrumented rod to the inner wall rigidly in the circumferential direction of the passage and with at least one degree of freedom to move in a first given direction extending between the inner and outer walls of the passage, wherein at least a radial component is present along the first given direction, and wherein the inner connection means fasten the inner end of the instrumented rod to the inner wall with a degree of freedom to move in a second given direction substantially perpendicular to the first given direction.

2. A passage according to claim 1, wherein a shoe and the inner end of the instrumented rod are engaged relative to each and configured to slide in at least said first given direction.

3. A passage according to claim 2, wherein the shoe comprises a first shoe portion and a second shoe portion that are secured to each other and that define a housing in which the inner end of the rod is configured to move at least in said first given direction.

4. A passage according to claim 3, wherein the housing is defined by a downstream lug extending outwards from the second shoe portion and by a U-shaped recess that is open in the downstream direction in the first shoe portion.

5. A passage according to claim 4, wherein the second shoe portion is L-shaped with an axial wall carrying the downstream lug extending between the first shoe portion and the inner wall.

6. A passage according to claim 5, wherein the axial wall of the second shoe portion is engaged axially in an axial groove in an inner face of the first shoe portion.

7. A passage according to claim 6, wherein the thickness of said axial wall is greater than the depth of said axial groove.

8. A passage according to claim 3, wherein the inner end of the rod is mounted with clearance relative to the second shoe portion.

9. A passage according to claim 2, wherein at least one through orifice is formed in the inner end of the instrumented rod and is aligned in the circumferential direction with at least one through orifice in the shoe, a locking member being engaged through the at least one through orifice in the shoe and the at least one through orifice in the inner end of the instrumented rod.

10. A passage according to claim 9, wherein the section of the at least one orifice in the shoe is contained within the section of the at least one orifice in the inner end of the rod.

11. A passage according to claim 10, wherein said at least one orifice in the shoe or in the inner end of the rod is of oblong shape, being elongate in alignment with the instrumented rod.

12. A passage according to claim 9, wherein the locking member engaged through the orifices in the shoe and the inner end of the rod is a self-locking bolt configured so as to avoid clamping the shoe against the instrumented rod.

13. A passage according to claim 1, wherein a shoe is fastened rigidly to a first shroud forming the inner wall of the passage, said shroud being arranged downstream from an annular row of stationary vanes extending across the passage and upstream from a perforated second shroud for bleeding air, and wherein the outer end of the rod is fastened relative to the outer wall downstream from said row of stationary vanes.

14. A passage according to claim 13, wherein the shoe has a downstream portion arranged axially facing the perforated second shroud and radially at a distance therefrom, the shoe being fastened to the inner end of the rod at said downstream portion.

15. A passage according to claim 1, wherein the inner end of the instrumented rod is situated upstream relative to the outer end of the instrumented rod.

16. A passage according to claim 1, wherein a spacer is mounted between the outer end of the instrumented rod and the outer wall of the passage.

17. A turbine engine comprising a passage according to claim 1.

* * * * *

UNITED STATES PATENT AND TRADEMARK OFFICE
CERTIFICATE OF CORRECTION

PATENT NO.         : 9,856,743 B2
APPLICATION NO.    : 14/722877
DATED              : January 2, 2018
INVENTOR(S)        : Florian J. Kockenpo et al.

Page 1 of 1

It is certified that error appears in the above-identified patent and that said Letters Patent is hereby corrected as shown below:

On the Title Page

Item (72), second Inventor should read:
Jérôme Acquaviva Moissy Cramayel (FR);

Signed and Sealed this
Ninth Day of July, 2019

Andrei Iancu
*Director of the United States Patent and Trademark Office*